United States Patent
Kim et al.

(10) Patent No.: US 9,436,405 B2
(45) Date of Patent: Sep. 6, 2016

(54) COMPLEX PARTITIONING OF STORAGE LIBRARY RESOURCES

(71) Applicant: Oracle International Corporation, Redwood City, CA (US)

(72) Inventors: Hyoungjin Kim, Boulder, CO (US); Alexander Edward Amador, Morrison, CO (US); Stephanie Lynn Russell, Erie, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 157 days.

(21) Appl. No.: 14/139,466

(22) Filed: Dec. 23, 2013

(65) Prior Publication Data

US 2015/0178012 A1  Jun. 25, 2015

(51) Int. Cl.
| | |
|---|---|
| *G06F 3/06* | (2006.01) |
| *G06F 11/00* | (2006.01) |
| *G11B 33/00* | (2006.01) |
| *H04L 29/08* | (2006.01) |

(52) U.S. Cl.
CPC .......... *G06F 3/0644* (2013.01); *G06F 3/0605* (2013.01); *G06F 3/067* (2013.01); *G06F 3/0614* (2013.01); *G06F 3/0619* (2013.01); *G06F 3/0635* (2013.01); *G06F 3/0686* (2013.01); *G06F 3/0689* (2013.01); *G06F 11/00* (2013.01); *G11B 33/00* (2013.01); *H04L 67/1097* (2013.01)

(58) Field of Classification Search
CPC .. G06F 3/0619; G06F 3/0644; G06F 3/0686; G06F 3/06; G06F 3/0601; G06F 3/0671; G06F 3/0668; G06F 3/0683; G06F 11/1067; G06F 11/1616; G06F 11/162
See application file for complete search history.

(56) References Cited

U.S. PATENT DOCUMENTS

| | | | | |
|---|---|---|---|---|
| 5,815,649 | A * | 9/1998 | Utter et al. | 714/6.11 |
| 6,029,230 | A * | 2/2000 | Ng | 711/159 |
| 6,336,173 | B1 * | 1/2002 | Day et al. | 711/161 |
| 6,353,878 | B1 * | 3/2002 | Dunham | 711/162 |
| 6,425,059 | B1 * | 7/2002 | Basham et al. | 711/153 |
| 6,715,031 | B2 * | 3/2004 | Camble et al. | 711/111 |
| 6,791,910 | B1 * | 9/2004 | James et al. | 369/30.28 |
| 2002/0199077 | A1 * | 12/2002 | Goodman et al. | 711/202 |
| 2003/0123274 | A1 * | 7/2003 | Camble | G06F 3/0601 365/100 |
| 2003/0126327 | A1 * | 7/2003 | Pesola et al. | 710/74 |
| 2003/0126360 | A1 * | 7/2003 | Camble | G06F 3/0622 711/114 |
| 2003/0126361 | A1 * | 7/2003 | Slater et al. | 711/114 |
| 2005/0013149 | A1 * | 1/2005 | Trossell | 365/1 |

(Continued)

*Primary Examiner* — Jared Rutz
*Assistant Examiner* — Jean Edouard
(74) *Attorney, Agent, or Firm* — Marsh Fischmann & Breyfogle LLP; Daniel J. Sherwinter

(57) ABSTRACT

Systems and methods are described for logical partitioning of library resources (e.g., storage media resources and/or media drive resources in storage libraries) across a complex of multiple, physically distinct, but logically interconnected data storage libraries. For example, a user selects complex-wide resources to add to one or more library partitions via a graphical user interface displayed on a local console of one of the storage library systems. The partitions can be validated and converted into a partition definition. In some implementations, the partition definition is redundantly stored as a predefined short format in local storage of some or all the storage library systems in the complex. This can minimize the resources used to store the partition definition, provide redundancy for added configuration options and/or in case of certain failures, speed up processing of resource queries, and/or provide other features.

21 Claims, 9 Drawing Sheets

(56) References Cited

U.S. PATENT DOCUMENTS

| | | | |
|---|---|---|---|
| 2005/0043852 A1* | 2/2005 | Gallo | G06F 3/0605 700/214 |
| 2005/0063089 A1* | 3/2005 | Starr | G11B 15/6835 360/92.1 |
| 2005/0080992 A1* | 4/2005 | Massey | G06F 3/0605 711/114 |
| 2006/0069844 A1* | 3/2006 | Gallo | G06F 3/0607 711/4 |
| 2006/0095534 A1* | 5/2006 | Camble et al. | 709/215 |
| 2007/0028043 A1* | 2/2007 | Jantz et al. | 711/114 |
| 2007/0220248 A1* | 9/2007 | Bittlingmayer et al. | 713/100 |
| 2008/0015734 A1* | 1/2008 | Wideman et al. | 700/214 |
| 2008/0022038 A1* | 1/2008 | Akagawa | G06F 3/0605 711/111 |
| 2008/0155212 A1* | 6/2008 | Stock et al. | 711/162 |
| 2008/0235476 A1* | 9/2008 | Goodman | G11B 15/68 711/163 |
| 2009/0028339 A1* | 1/2009 | Goodman et al. | 380/278 |
| 2009/0049224 A1* | 2/2009 | Justiss et al. | 710/305 |
| 2009/0157710 A1* | 6/2009 | Tyndall | G06F 3/0605 |
| 2010/0082648 A1* | 4/2010 | Potapov et al. | 707/756 |
| 2010/0199061 A1* | 8/2010 | Justiss | G06F 3/0607 711/173 |
| 2011/0087833 A1* | 4/2011 | Jones | 711/104 |
| 2011/0196717 A1* | 8/2011 | Colliat et al. | 705/7.29 |
| 2012/0102288 A1* | 4/2012 | Wideman | 711/170 |
| 2012/0317258 A1* | 12/2012 | Billington | 709/223 |
| 2014/0223095 A1* | 8/2014 | Storm et al. | 711/114 |

* cited by examiner

FIG. 5

COMPLEX PARTITIONING OF STORAGE LIBRARY RESOURCES

FIELD

Embodiments relate generally to data storage systems, and, more particularly, to complex-wide partitioning of storage media resources and/or media drive resources in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic assembly finds the appropriate cartridge, removes the cartridge from its magazine, and carries the cartridge to a media drive that is designed to receive the cartridge and read its contents (and/or write to the medium). Some storage libraries are configured in a complex, so that multiple storage libraries, each having distinct physical environments, are logically interconnected into a larger library. Some commercial storage library complexes can include tens of media drives and tens of thousands of storage media.

It can be desirable in various contexts to be able to logically partition the storage library effectively into sub-libraries. For example, partitioning the storage library can facilitate distribution of physical library resources across multiple departments (e.g., legal, financial, human resources, etc.) and/or customers. In such contexts, it can be further desirable to handle those library partitions in such a way that permits access control, cost distribution, and other functions at the partition level. These types of partition handling functions can prove difficult in a single library context, and additional difficulties can arise when attempting to implement these functions across the resources of a complex of multiple storage libraries.

BRIEF SUMMARY

Among other things, systems and methods are described for complex-wide partitioning of storage media resources and/or media drive resources in storage libraries. Some embodiments operate in context of a complex of multiple physically distinct, but logically interconnected data storage libraries having a large number of storage media resources and media drive resources. The storage libraries can also have robotic assemblies that find, pick, and place physical storage media in physical media drives to fulfill requests by one or more host applications (e.g., backup applications). Users or other systems can configure multiple library partitions for logically segregating library resources across the complex. For example, a user selects complex-wide resources to add to one or more library partitions via a graphical user interface displayed on a local console of one of the storage library systems. The partitions can be validated (e.g., to make sure there are not conflicting partition definitions, etc.) and converted into a partition definition. In some implementations, the partition definition is redundantly stored as a predefined short format in local storage of some or all the storage library systems in the complex.

According to one set of embodiments, a storage library complex in communication with a host system is provided. The complex includes a number of storage library systems, each storage library system being logically interconnected with the other storage library systems. Each storage library system defines a physically distinct environment that includes: a number of storage media resources; a number of media drive resources that operate to perform input/output functions on the storage media resources; a local memory that operates to store a partition definition that identifies which of the storage media resources and which of the media drive resources from across the plurality of storage library systems are presently assigned to each of a number of complex-wide partitions; and at least one processor. The at least one processor operates to: receive a request from a host system involving requested resources of at least one of the storage library systems, the requested resources including at least one of storage media resources or media drive resources from the storage library systems; query the partition definition according to the request to determine which of the complex-wide partitions include the requested resources; and communicate a response to the host system according to which of the complex-wide partitions is determined to include the requested resources.

According to another set of embodiments, a method is provided for partitioning a storage library complex in communication with a host system. The method includes: receiving a request from a host system involving requested resources of at least one of a number of storage library systems, the requested resources comprising at least one of storage media resources or media drive resources from the storage library systems, each storage library system being logically interconnected with the other storage library systems, and each storage library system defining a physically distinct environment that has a number of storage media resources, a number of media drive resources that operate to perform input/output functions on the storage media resources, and a local memory that operates to store a partition definition that identifies which of the storage media resources and which of the media drive resources from across the storage library systems are presently assigned to each of a number of complex-wide partitions; querying the partition definition according to the request to determine which of the complex-wide partitions include the requested resources; and communicating a response to the host system according to which of the complex-wide partitions are determined to include the requested resources. According to another set of embodiments, a set of processors is provided in communication with tangible, non-transient storage having instructions stored thereon, which, when executed, cause the set of processors to perform at least some steps of the method.

BRIEF DESCRIPTION OF THE DRAWINGS

The present disclosure is described in conjunction with the appended figures:

FIG. 5 shows an illustrative user interface through which various complex-wide partitioning functions can be performed, according to various embodiments;

Figure 1:
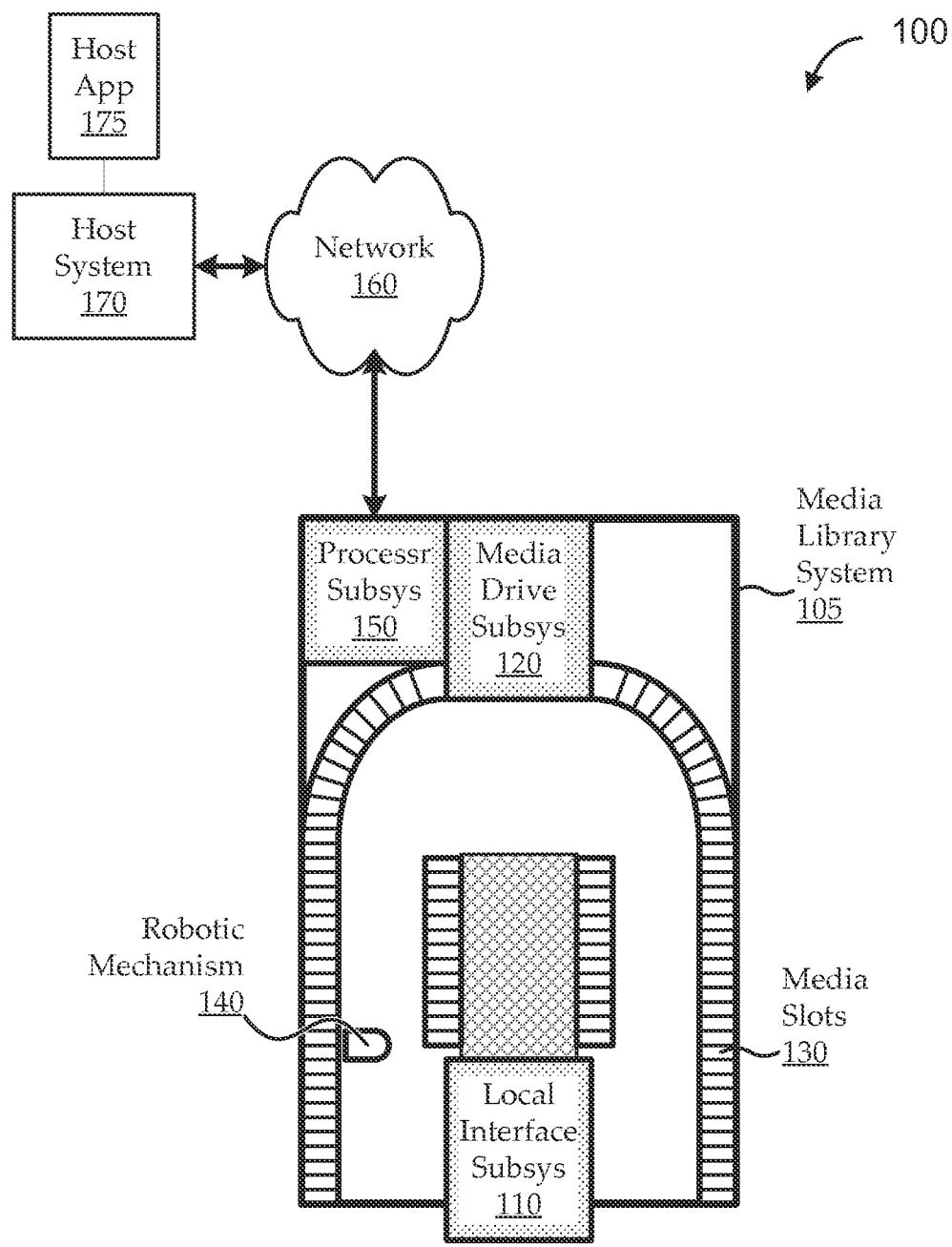
FIG. 1 shows a simplified diagram of a data storage system that provides illustrative context.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

It can be desirable in various contexts to be able to logically partition a storage library effectively into sub-libraries, for example, to distribute (e.g., segregate) physical library resources across multiple departments and/or customers. For example, a company has a storage library with 10,000 tape cartridges allocated for backup, of which the legal department is allocated 2,500, the human resources department is allocated 1,500, the engineering department is allocated 2,500, and the financial department is allocated 3,500. The cost of the library can be similarly distributed (e.g., allocated) across the departments as 25 percent to each of the legal and engineering departments, 15 percent to the human resources department, and 35 percent to the financial department. It can be desirable in such a context to limit access from one department to another department's resources, while still allowing a library administrator to reallocate (i.e., re-partition) resources from across the entire library.

Some embodiments operate in context of a library complex, a term used herein to describe a collection of multiple storage library systems that are physically distinct (e.g., with no cross-over of resources between the libraries or with limited crossover, as with pass-through ports, or the like), but logically interconnected. In some implementations, the library complex can include very large numbers of storage media resources and media drive resources. For example, the SL8500 library from Oracle can support over 10,000 tape cartridges and 64 tape drives per storage library system, and up to ten storage library systems can be configured as a complex (for a potential total capacity of over 100,000 total cartridges and 640 tape drives across the library complex). Embodiments described herein facilitate partitioning of storage media resources and/or media drive resources across a library complex of multiple storage library systems. For example, a user selects complex-wide resources to add to one or more library partitions via a graphical user interface displayed on a local console of one of the storage library systems. The library partitions (e.g., up to sixteen) can be validated and converted into a partition definition. The partition definition can be redundantly stored (e.g., in a predefined short format) in local storage of some or all the storage library systems in the complex. This can minimize the resources used to store the partition definition, provide redundancy for added configuration options and/or in case of certain failures, speed up processing of resource queries, and/or provide other features.

FIG. 1 shows a simplified diagram of a data storage system 100 that provides illustrative context. The data storage system 100 illustrated in FIG. 1 is intended only to provide one illustrative context, and is not intended to limit the scope of embodiments to any particular library architecture, components, arrangement of components, etc. While embodiments are described with reference to particular tape media storage libraries (e.g., using tape cartridges to store data), similar techniques can be applied in any suitable context, including, for example, other types of tape media storage libraries, other storage libraries that use multiple physical non-tape storage media, etc.

The data storage system 100 includes a single storage library system 105 that has a number of storage media (e.g., tape cartridges, or the like) located in media slots 130. One or more robotic assemblies 140 in the storage library system 105 can pick and place the storage media, including ferrying the storage media between the media slots 130 and one or more media drives in a media drive subsystem 120. Some embodiments permit a user to directly interface with the storage library system 105 via a local interface subsystem 110. Operations of the storage library system 105, including certain functionality of the local interface subsystem 110, the media drive subsystem 120, the robotic assemblies 140, etc. can be controlled by a processor subsystem 150. For example, the processor subsystem 150 can include one or more processors in one or more locations throughout the storage library system 105 that are in communication with one or more memories having instructions stored thereon, which, when executed, cause the processors to perform certain functionality.

In some embodiments, the storage library system 105 includes a large number of media slots 130 arranged in arrays of rows and columns. Some or all of the media slots 130 hold storage media. For example, one implementation has 1,448 media slots 130, and expansion modules can be used to increase the capacity to up to 10,088 slots. Another implementation has 200 media slots 130, and expansion modules can be used to increase the capacity to up to 5,925 slots. The storage library system 105 can also include a number of drive slots, with some or all of the drive slots holding media drives. For example, one implementation includes 64 drive slots in the media drive subsystem 120. Another implementation includes 24 drive slots, and can be expanded to up to 56 drive slots. Rails or other structure allows multiple robotic assemblies 140 to traverse the arrays of media slots 130 and drive slots, so that hand assemblies of the robotic assemblies 140 (e.g., "handbots") can perform pick and place operations on the storage media in the media slots 130 and/or media drives. For example, one implementation includes four handbots that ride on horizontal and vertical rails, so that each handbot effectively services a quarter of the media slots 130 (e.g., 362 of 1,448 media slots 130), but can physically pass each other to facilitate concurrent operations. Another implementation includes multiple (e.g., two) handbots per rail for further redundancy and/or concurrency. Some implementations include many other types of components that can be part of the illustrated subsystems or other subsystems that are not shown. For example, implementations can include one or more cartridge access ports (CAPs), power supplies and/or other power management components (e.g., AC, DC, three-phase, or other power supplies, power distribution units (PDUs), etc.), communications components (e.g., switches, hubs, servers, cables, ports, etc.), control cards, environmental sensors (e.g., fire detectors, etc.), structure (e.g., chassis, doors, service panels, open rack or shelf spaces, etc.), etc.

In some embodiments, functions of the storage library system 105 can be accessed and/or controlled remotely. As illustrated, the storage library system 105 can be in communication with a network 160, which can be further in communication with one or more host systems 170. For example, the host systems 170 provide remote user terminals and/or remote application interfaces by which other systems and/or human users can interact with the library. In some implementations, a host application 175 (e.g., a backup application) runs on the host system 170, which exploits the storage library system 105 resources for data storage and input/output functions.

Figure 2:
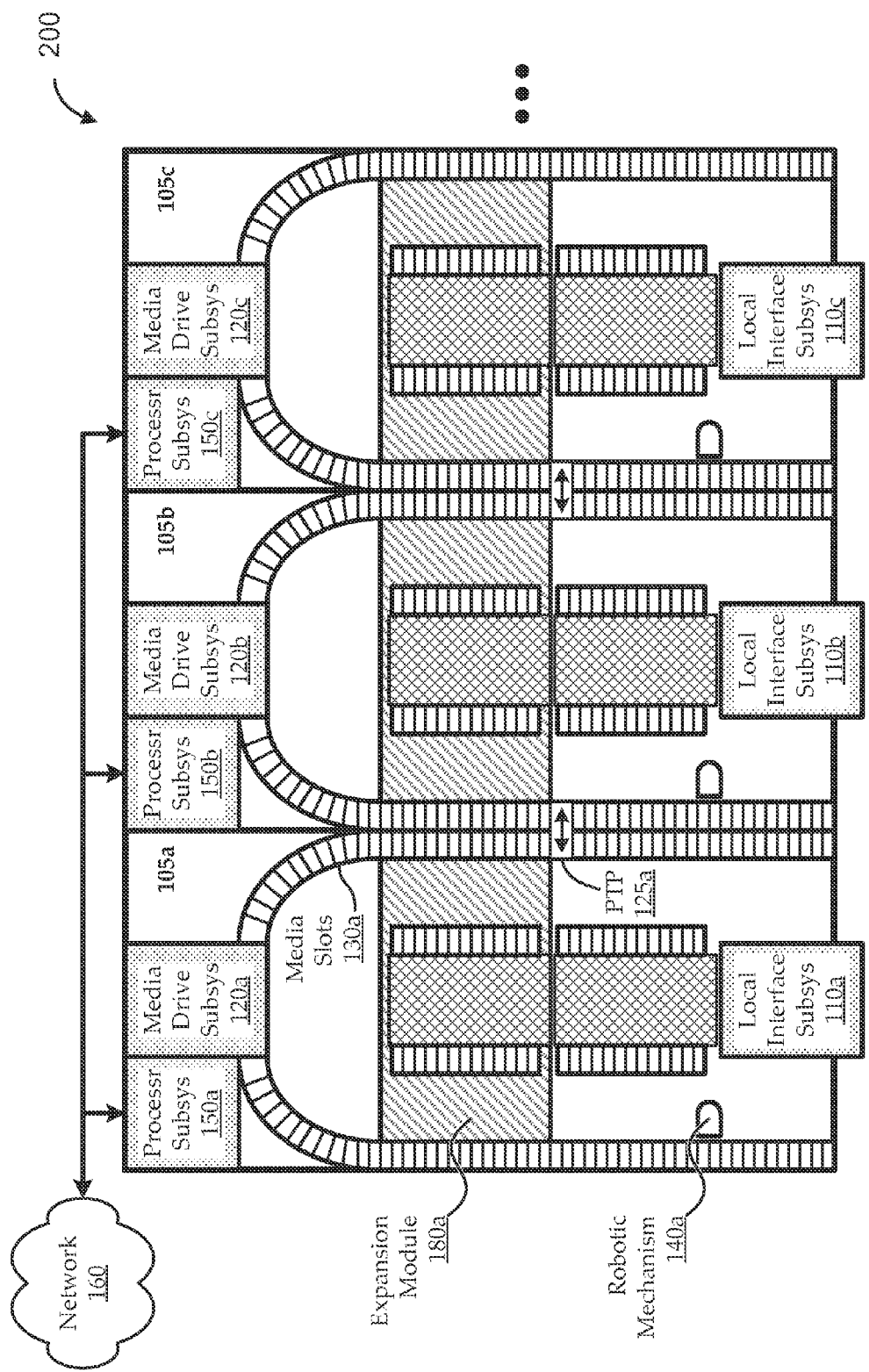
FIG. 2 shows an illustrative configuration of an expanded storage library system implemented as a library complex.

Some embodiments of the storage library system 105 can be expanded in one or more dimensions. FIG. 2 shows an illustrative configuration of an expanded storage library system 105 implemented as a library complex 200. The library complex 200 includes a number of physically distinct storage library systems 105. As illustrated, each storage library system 105 can have its own local interface subsystem 110, media drive subsystem 120, processor subsystem 150, media slots 130, robotic assemblies 140, etc. Alternatively, the library complex 200 can share certain subsystems. For example, a single local interface subsystem 110 can be used for the entire library complex 200. Some or all of the individual storage library systems 105 can also be expanded using expansion modules 180. For example, the expansion modules 180 are illustrated as adding media slots 130 to each storage library system 105, but they can also or alternatively add media drives, processors, robotic assemblies 140, etc. in other implementations. In some implementations, the storage library systems 105 are configured with pass-through ports (PTPs) 125, which can facilitate transferring of storage media from one storage library system 105 to another storage library system 105 in the library complex 200. It is noted that reference to the individual storage library systems 105 as physically distinct is intended to include implementations in which there is limited physical interconnection among the libraries via PTPs, or the like.

The library complex 200 can be in communication with external interfaces in any suitable manner, for example, via one or more networks 160. The networks 160 can include any suitable communications framework, including local or wide-area communications, wired or wireless communications, secure or unsecure communications, etc. Communications can occur via "intra-complex" networks (e.g., a local-area network (LAN) between the storage library systems 105 of the library complex 200) and/or via "external" networks. As used herein, an "external" network is intended to broadly include any network that facilitates communications to and/or from the library complex 200 (i.e., as opposed to only within the library complex 200). For example, the entire external network can be implemented as a LAN in a single room, along with the library complex 200 and one or more user terminals, or the external network can be implemented as the Internet, a distributed LAN, a wide-area network (WAN), or in any other suitable manner. In one implementation, each storage library system 105 in the library complex 200 has its own, distinct communications path with one or more networks. This can provide certain features relating, for example, to redundancy, efficiency, security, etc. In another implementation, one storage library system 105 of the library complex 200 is in direct communication with one or more networks, and the other storage library systems 105 of the library complex 200 are in indirect communication with those networks via an intra-complex network. Some implementations use an Internet protocol (IP) network, so that communications can be implemented using standard IP techniques, browser-based graphical user interfaces (GUIs), standard transport mechanisms, etc. For example, intra-complex (or intra-library) communications within and/or between storage library systems 105 and library components are implemented using Simple Network Management Protocol (SNMP), while communications with external networks and interfaces are implemented hypertext transport protocol (HTTP) and/or secure HTTP (HTTPS). Other communications can use proprietary or non-proprietary protocols, TCP/IP sockets, or any other suitable communications techniques.

Figure 3:
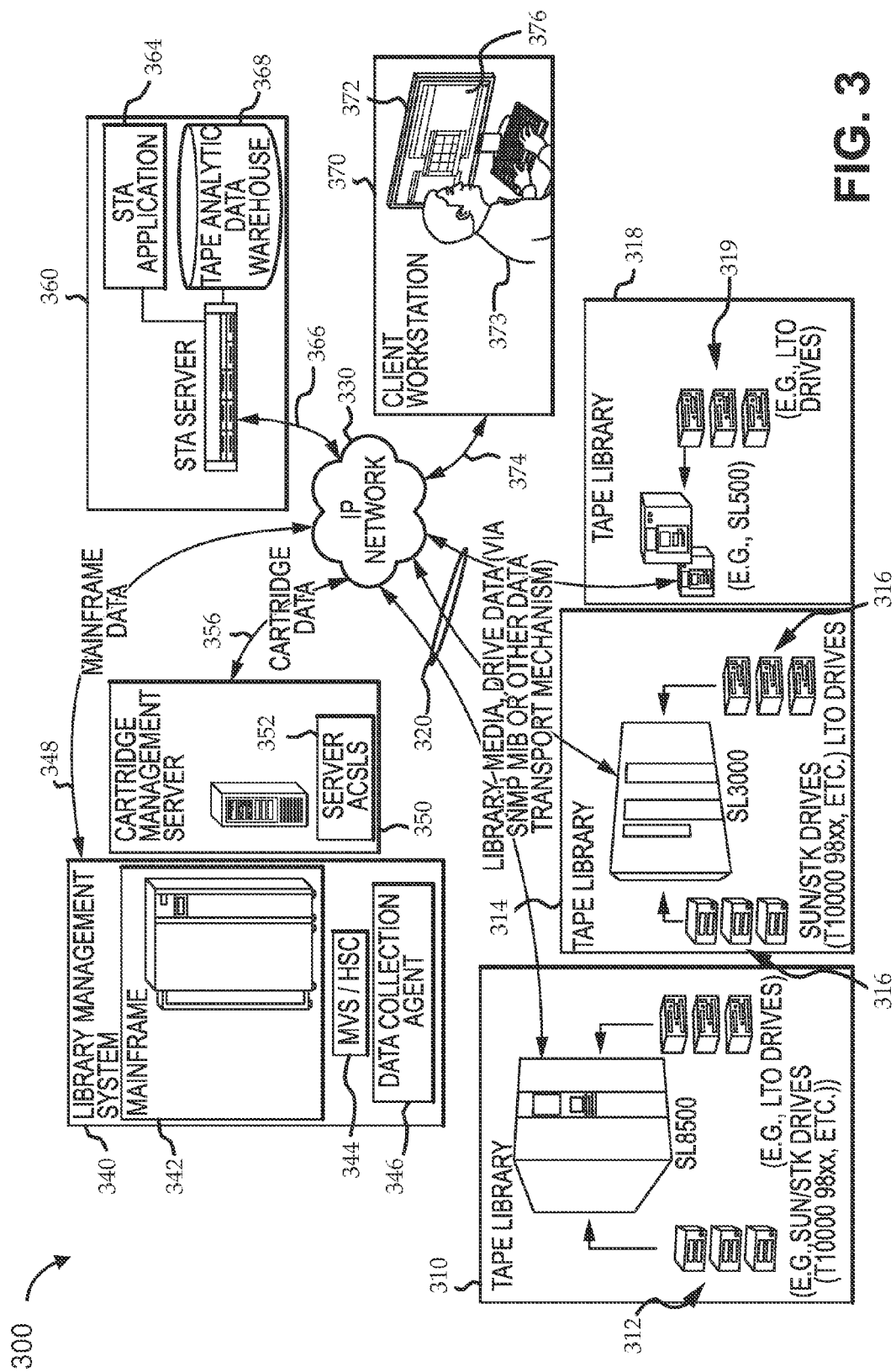
FIG. 3 shows a simplified diagram of an illustrative data storage system that provides further context for certain embodiments.

FIG. 3 shows a simplified diagram of an illustrative data storage system 300 that provides further context for certain embodiments. As illustrated, the system 300 includes a number of tape libraries 310, 314, 318, each with a number of tape drives 312, 316, 319. The tape libraries 310, 314, 318 can be implementations of the storage library systems 105 of FIG. 1 or 2. For example, the libraries 310, 314, 318 may be implemented as Oracle's StorageTek libraries (e.g., the SL8500, SL3000, SL500, or similar or future libraries), and the drives 312, 316, 319 may be implemented Oracle's StorageTek drives (and media) (e.g., the T10000 A/B/C, T9840 C/D) or LTO 3/4/5 from HP and IBM. Tape media e.g., cartridges can be ferried between storage locations (e.g., a physical slot of a storage magazine) and one or more of the drives 312, 316, 319, where the tape media can be mounted and dismounted from the tape drives 312, 316, 319. Embodiments can perform complex-wide partitioning of library resources, including the tape media and/or the tape drives 312, 316, 319.

The data storage system 300 can include or be in communication with any suitable functional components. For example, as illustrated, embodiments can include or be in communication with a library management system 340, a cartridge management server 350, a storage tape analytics server 360, etc. Embodiments of the library management system 340 can include a mainframe or other computer device running an operating system and management software applications 344. For example, the operating system can be Multiple Virtual Storage (MVS) provided by IBM, and the management software can be Host Software Component (HSC) provided by Oracle, or any other suitable operating systems and/or library management software can be utilized. A data collection agent 346 can be provided in the data storage system 300 to collect library management-specific (e.g., HSC-specific) data 348, which can be transmitted (e.g., via IP network 330) to an STA (Storage Tape Analytics) server 360 or other components of the data storage system 300. Embodiments of the cartridge management server 350 can run one or more applications 352, such as Automated Cartridge System Library Software (ACSLS), to control an automated cartridge system; and cartridge management-specific (e.g., ACSLS-specific) data 356 can be provided by the application 352 (e.g., over IP network 330) to any suitable component of the data storage system 300 (e.g., to the STA server 360 for use in analytics of tape operations in the tape libraries 310, 314, 318). Embodiments of the STA server 360 can implement an STA application 364 to manage collection and storage of various analytics data 366 (e.g., including or derived from data 320, 348, 356) from various data sources, which can be collected in a tape analytics data warehouse 368 (e.g., a database(s) in memory of server 360 or accessible by server 360) for use in performing various analytics functions.

Some embodiments permit receipt of client data 374 (e.g., instructions, queries, etc.) from and output of client data 374 to one or more local interfaces, client workstations 370, etc. For example, a user 373 can interface with the data system 300 using a client node or workstation 370 via a monitor/display device 372 and/or any suitable user interface device. As described above, the various components, client workstations 370, and/or other elements of the data system 300 can communicate over any suitable communications framework, including local or wide-area communications, wired or wireless communications, secure or unsecure communications, etc. For example, implementations use an Internet protocol (IP) network (such as network 330) and standard IP techniques, browser-based graphical user interfaces (GUIs) 376, standard transport mechanisms, etc. Intra-library and/or intra-complex communications can be implemented using SNMP, while external communications (e.g., client workstations 370) can be implemented using HTTP or HTTPS.

Figure 4:
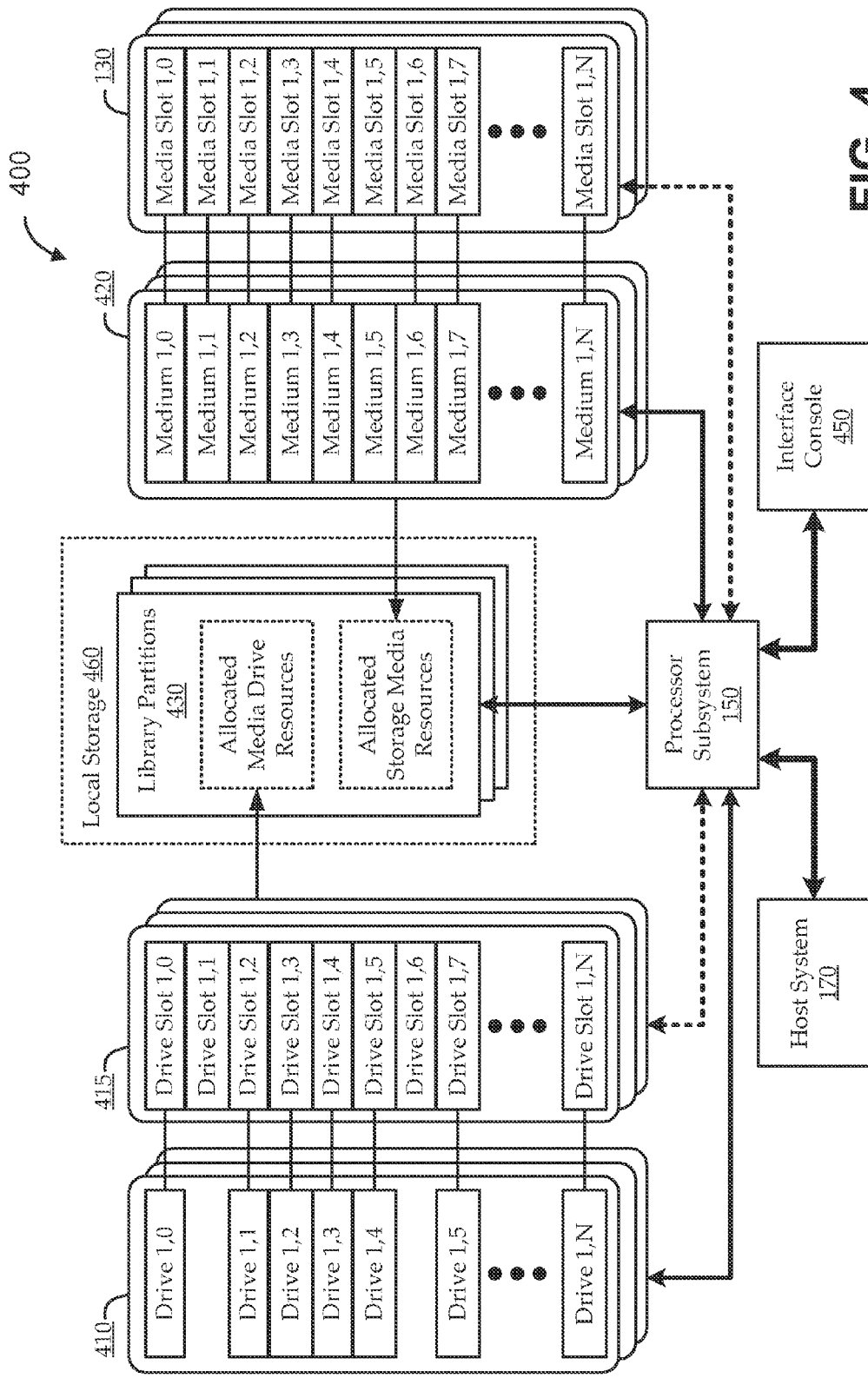
FIG. 4 shows an illustrative logical view of a library environment that supports complex-wide library partitioning, according to various embodiments.

FIG. 4 shows an illustrative logical view of a library environment 400 (e.g., the library complex 200 of FIG. 2) that supports complex-wide library partitioning, according to various embodiments. The library environment 400 includes a number of media slots 130, at least some having tangible storage media 420 disposed therein, and a number of logical drive slots 415, at least some having tangible media drives 410 disposed therein. The media slots 130 and/or tangible storage media 420 of a particular storage library system 105 can be referred to as its storage media resources, the logical drive slots 415 and/or tangible media drives 410 of a particular storage library system 105 can be referred to as its media drive resources, and the storage media resources and/or media drive resources of a particular storage library system 105 can be referred to as its library resources. In some implementations, complex-wide resources can include the collection of library resources from all the storage library systems 105 of the library complex 200. As described above, the physical implementation of the storage library system 400 can have one or more robotic assemblies 140 that operate to ferry the storage media between the media slots 130 and the media drives 410.

In some embodiments, logical functions (e.g., data processing and other input/output functions) consider some or all of the physical components as addressable library (e.g., complex-wide) resources. For example, a local or external application can interact with a media drive resource, which can represent a logical drive slot location (e.g., which, in turn, can correspond to an associated physical drive slot location and/or to whatever physical media drive, if any, is installed in the associated physical drive slot location), or a logical drive (e.g., according to logical drive information detected or generated by the library when the physical drive is logically installed). A local or external application can also interact with a storage media resource, which can represent a logical storage media volume (e.g., which, in turn, can correspond to an associated physical media slot 130 location and/or to whatever physical storage medium, if any, is installed in the associated physical media slot 130 location).

Interacting with logical resources, as opposed to with the physical resources themselves, can provide certain features. Suppose, for example, that a library complex 200 has six-hundred drive slots 415, but the library owner has only purchased and installed one-hundred media drives 410. Further, suppose that the library owner desires to assign all the complex-wide drive resources to partitions. In such a scenario, the library owner can assign all six-hundred drive slots 415 to multiple complex-wide partitions, even if some of those drive slots 415 are empty. For example, the library owner can physically move, replace, upgrade, etc. media drives 410 without impacting the partition definitions.

As illustrated, various library resources can be accessed by processors and/or related processing and control components of any suitable subsystems of the library (represented generally as a processor subsystem 150) and by one or more external interface systems (represented generally by a host system 170 and/or an interface console 450). In various implementations, the interface console 450 can be a local console of one or more of the storage library systems 105, a console that is physically separate from the library complex 200 but in direct communication therewith, a console implemented through a host system 170 or remote terminal, etc. As described above, a library complex 200 can include a number of storage library systems 105, each defining a physically distinct environment for a respective portion of the complex-wide storage media resources slots (e.g., storage media 420 and/or media slots 130), a respective portion of the complex-wide drive resources (e.g., media drives 410 and/or drive slots 415), and at least one of the robotic assemblies 140, while being logically interconnected (e.g., in logical communication). In some embodiments, multiple host systems 170, interface consoles 450, and/or other systems are in communication with the library complex 200, and the various systems can have different levels of access to different partitions. For example, a particular host system 170 can be authorized to access only a subset of the complex-wide partitions (e.g., a host system 170 of the human resources department can only access a partition allocated to the human resources department). Accordingly, when a host system 170 issues a request (e.g., requests a listing of its accessible complex-wide library resources), querying the partition definition can involve determining an authorized set of the complex-wide partitions that the host system 170 is authorized to access, and determining which of the complex-wide library resources are included in the authorized set of complex-wide partitions.

Figure 5:
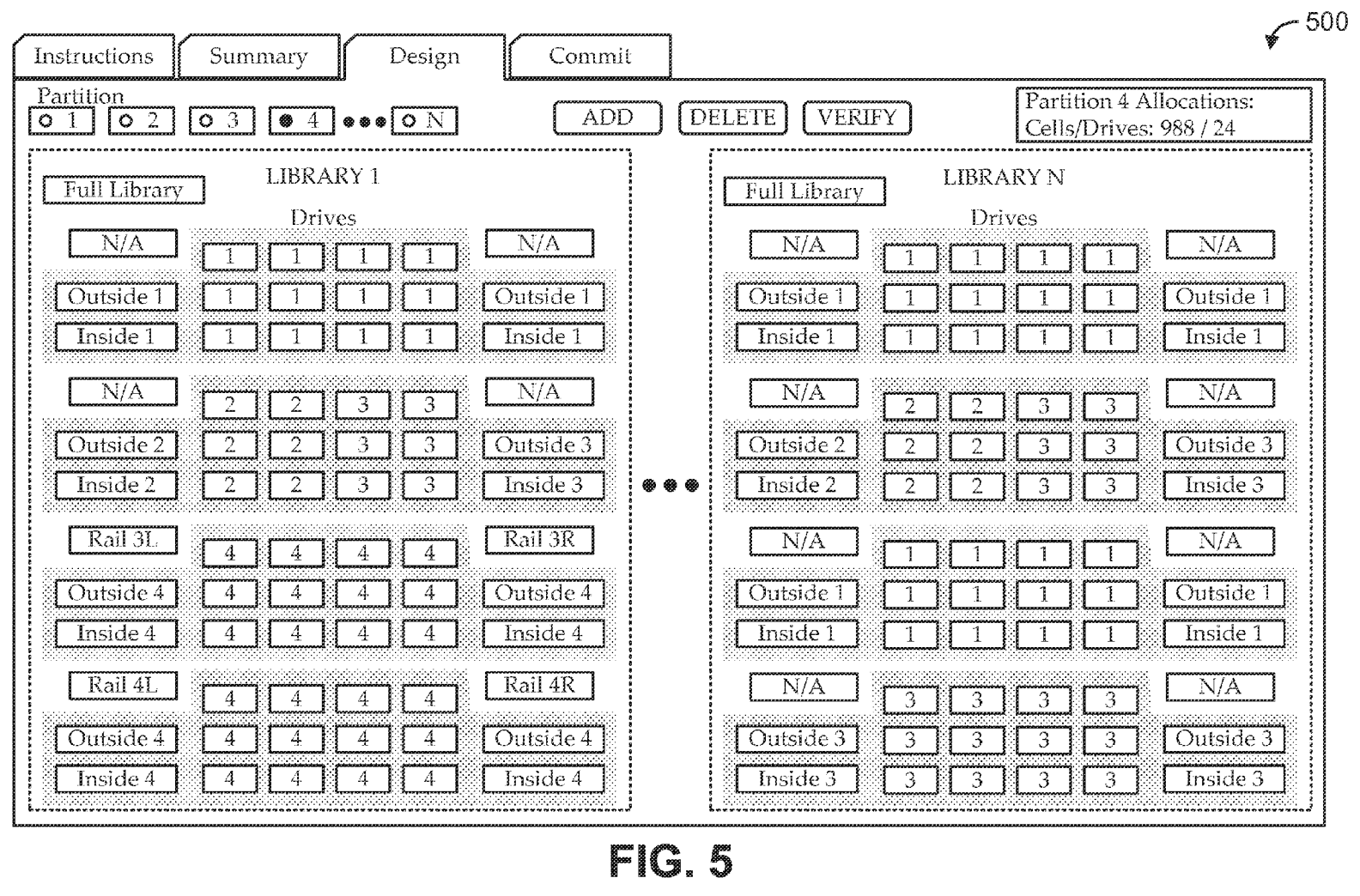

FIG. 5 shows an illustrative user interface 500 through which various complex-wide partitioning functions can be performed, according to various embodiments. The illustrated user interface 500 is intended to provide only one example, and many modifications can be made without departing from the scope of the invention. The user interface 500 can include a number of tabs or windows. One implementation includes "Instructions," "Summary," "Design," and "Commit" windows selectable by tabs in the upper left portion of the user interface 500. The "Instructions" window can provide various user instructions for navigating the other windows. For example, the user can be instructed to quiesce any host applications that carry out library operations, etc. The "Summary" window can show a summary of the present partition allocations across the complex, allow adding or removing of entire partitions, show total resource information by library and/or by complex, allow naming of partitions and/or resources, etc. The "Design" window (shown) can provide an interface for configuring the partitions, validating partition configurations, etc., for example, as described below. The "Commit" window can provide an interface for applying the configuration changes to the partition definition.

In the illustrated "Design" window, radio buttons are included for selecting a partition to configure, and Partition 4 is presently selected. In an upper-right portion of the illustrated window, a summary of allocated resources is provided that presently indicates that Partition 4 includes 988 storage media resources and 24 media drive resources across the complex. The illustrated window also includes frames for each library in the complex (only "Library 1" and "Library N" are shown to avoid over-complicating the figure). Each illustrated frame includes selectable resources. In the example shown, the smallest partition unit for media drive resources is a single media drive resource, and the smallest partition unit for storage media resources is a quarter-rail (e.g., inside-left rail 1, inside-right rail 1, outside-left rail 1, outside-right rail 1, etc.). For example, the user interface 500 can be displayed on a touch screen display of a local console of one of the storage library systems 105, and a user can touch each displayed resource to select or deselect the resource. "ADD" and "DELETE" buttons can be used to add or remove the selected resources from the selected partition. In the illustrated frames, present assignments are indicated by partition numbers. For example, all the media drive resources in all rows and columns on both sides of rail 1 of library 1 are presently assigned to Partition 1; and all the media drive resources in all rows and columns on both sides of rails 3 and 4 of library 1 are presently assigned to Partition 4. Some implementations also include a "Verify" button for validating configuration changes. Any suitable interface elements can be included to facilitate configuration of any suitable library components to the partitions.

Returning to FIG. 4, in some implementations, the processor subsystem 1150 (which may be distributed across multiple libraries in the complex) can assign perform complex-wide partitioning functionality, including configuring and handling complex-side library partitions 430 with allocated media drive resources and allocated storage media resources from across the library complex. For example, the library complex 200 includes a number of storage library systems 105, each being logically interconnected with the other storage library systems and each defining a physically distinct environment. Each storage library system 105 can include storage media resources (e.g., media slots 130 and/or tangible storage media 420) and media drive resources (e.g., logical drive slots 415 and/or tangible media drives 410) that operate to perform input/output functions on the storage media resources. Embodiments also include a local memory 460 that operates to store a partition definition that identifies which of the plurality of storage media resources and which of the plurality of media drive resources from across the complex are presently allocated (e.g., assigned) to each of a plurality of complex-wide library partitions 430. In some implementations, the local memory 460 is a memory of each storage library system 105 in the library complex 200, and can operate to redundantly store the partition definition (e.g., the partition definition can be identical or similar across the multiple local memories 460). The processor subsystem 150 can operate to facilitate various partition-related functions according to the stored partition definition. For example, the processor subsystem 150 can permit a user to set up and configure library partitions, including handling assigning of resources to each partition, validating partition assignments, handling access controls for the partitions, etc. Having set up the library partitions 430, the processor subsystem 150 can facilitate additional functionality, such as handling input/output, auditing, and/or other types of requests from the host system 170, interface console 450, and/or other systems when the requests involve library resources according to the present partition definition.

Some implementations of the partition definition seek to describe the present configuration of the library partitions 430 in a short format. This can minimize an amount of storage involved in maintaining the partition definition and can also reduce the time involved in processing requests that involve the partition definition (e.g., in processing queries, etc.). In some embodiments, for each of the complex-wide partitions having at least some library resources (e.g., at least one of storage media resources or media drive resources) allocated thereto, the partition definition has at least one partition entry, and each partition entry is associated with the respective partition, indicates whether the partition entry is for storage media resources or for media drive resources, and identifies at least some of the complex-wide library resources that are assigned to its respective partition. For example, the union of the partition entries associated with each respective partition can identify all the complex-wide library resources that are assigned to the respective partition.

Figure 6:
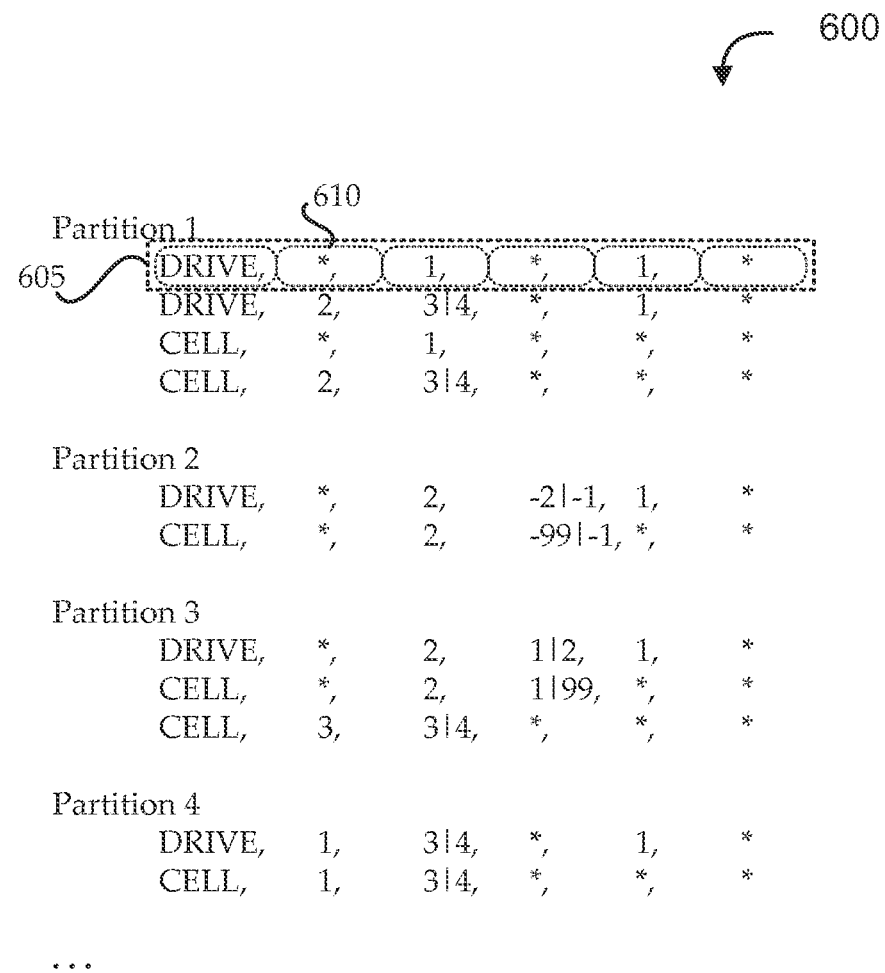
FIG. 6 shows an illustrative partition definition, according to various embodiments.

FIG. 6 shows an illustrative partition definition 600, according to various embodiments. The illustrated partition definition 600 defines a present configuration for four partitions, and each partition is defined by partition entries 605. As shown, each partition entry 605 includes a number of pre-defined fields 610, and each field 610 can correspond to a hierarchical locator having a number of associated locations. In the illustrated example, the fields 610 represent "resource type," "library number," "rail number," "column number, side," and "row number" (it is assumed in the example that the expression is parsed from left to right, though other embodiments can be parsed in any suitable manner). The hierarchical locators are not necessarily a strict hierarchy nor are they necessarily hierarchical order; rather some locators can be the parent of multiple other locators, some locators can be the children of multiple locators, some locators can share a level of the hierarchy, etc. Each field 610 can have a value that identifies a set of the associated locations, such that each partition entry 605 identifies at least some of the complex-wide library resources that are assigned to its respective partition as the intersection of the sets identified by its fields. For example, the intersection of all six fields 610 of each partition entry 605 can be parsed as the portion of complex-wide library resources defined by the partition entry 405, and the union of the four partition entries 605 under the "Partition 1" heading can be parsed as the portion of complex-wide library resources assigned to "Partition 1." The partition definition 600 can include any suitable number and type of partition entries 605, and the partition entries 605 can include any suitable number and type of fields 610. In some implementations, the value of each field 610 can identify an individual associated location for its corresponding hierarchical locator, a range of associated locations for its corresponding hierarchical locator (e.g., in a defined format, such as "[beginning of range]|[end of range]"), or all associated locations for its corresponding hierarchical locator (e.g., using a wildcard, such as "*").

For the sake of illustration, the "Partition 1" portion of the partition definition 600 includes four partition entries 605, and each entry 605 includes six fields 610. The first two partition entries 605 indicate that Partition 1 includes all media drive resources ("DRIVES") that are in all libraries, rail 1, all columns, side 1, and all rows; and all media drive resources that are in library 2, rails 3 and 4, all columns, side 1, and all rows. The last two partition entries 605 indicate that Partition 1 includes all storage media resources ("CELLS") that are in all libraries, rail 1, all columns, all sides, and all rows; and all storage media resources that are in library 2, rails 3 and 4, all columns, all sides, and all rows. Partition 2 includes all media drive resources that are in all libraries, rail 2, columns −2 and −1, side 1, and all rows; and all storage media resources that are in all libraries, rail 2, columns −99 to −1, all sides, and all rows. Partition 3 includes all media drive resources that are in all libraries, rail 2, columns 1 and 2, side 1, and all rows; all storage media resources that are in all libraries, rail 2, columns 1 to 99, all sides, and all rows; and all storage media resources that are in library 3, rails 3 and 4, all columns, all sides, and all rows. Partition 4 includes all media drive resources that are in library 1, rails 3 and 4, all columns, side 1, and all rows; and all storage media resources that are in library 1, rails 3 and 4, all columns, all sides, and all rows.

Figure 7:
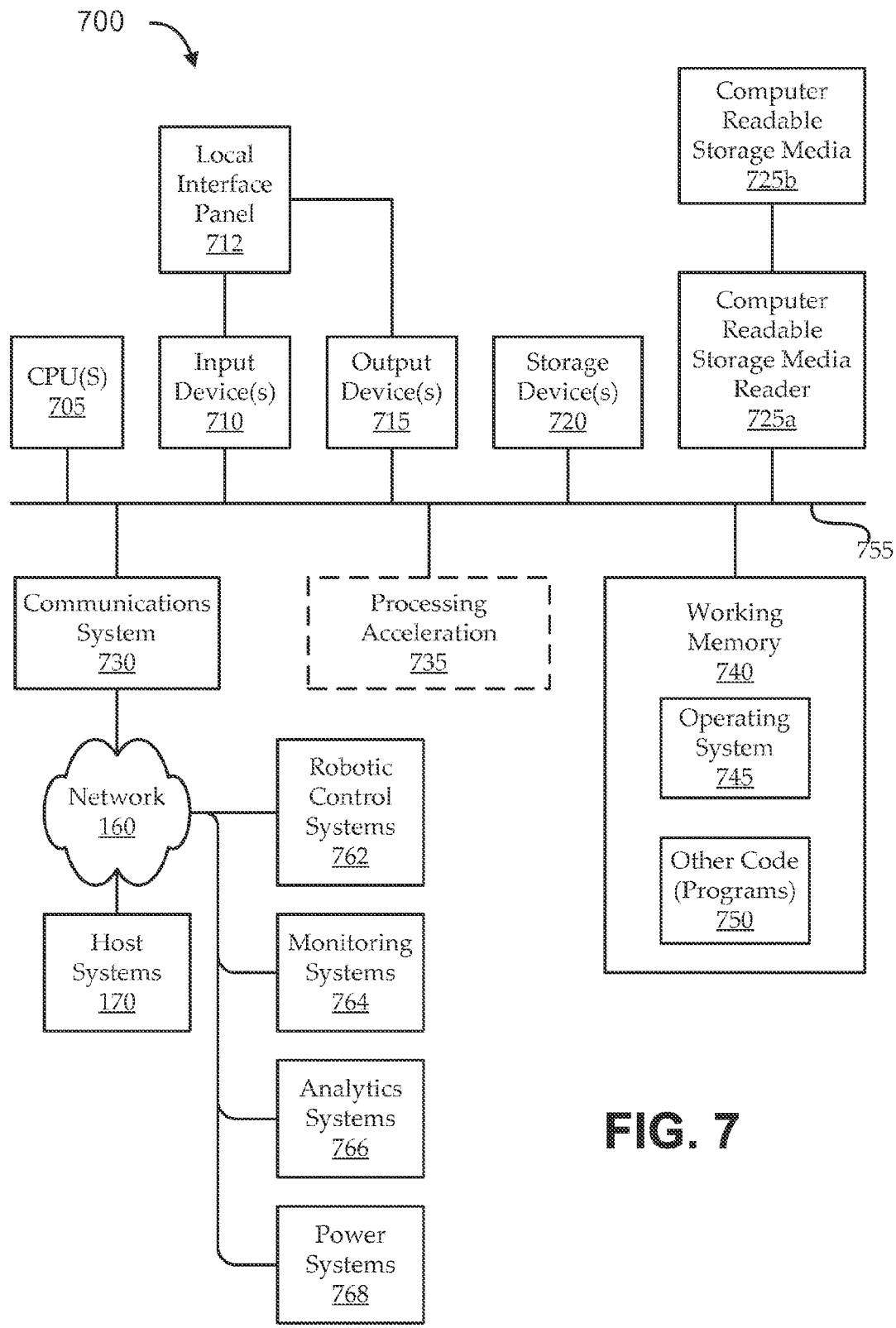
FIG. 7 shows an illustrative computational system for implementing functionality of various embodiments.

The various systems above can be implemented in any suitable manner. In some embodiments, some or all of the processor subsystem 150 is implemented as a computational system. FIG. 7 shows an illustrative computational system 700 for implementing functionality of various embodiments. The computational system 700 can include or perform functions of the processor subsystem 150, for example, including the complex-wide partitioning functions described herein. For the sake of simplicity, the computational system 700 is shown including hardware elements that can be electrically coupled via a bus 755. However, embodiments of the computational system 700 can be implemented as or embodied in single or distributed computer systems, in one or more locations, or in any other suitable way.

The hardware elements can include one or more central processing units (CPUs) 705, one or more input devices 710 (e.g., a mouse, a keyboard, etc.), and one or more output devices 715 (e.g., a display device, a printer, etc.). In some implementations, a local interface panel 712 (e.g., of the local interface subsystem 110) is used as an input and output device. The computational system 700 can also include one or more storage devices 720. By way of example, storage device(s) 720 can be disk drives, optical storage devices, solid-state storage device such as a random access memory (RAM) and/or a read-only memory (ROM), which can be programmable, flash-updateable and/or the like. The computational system 700 can additionally include a computer-readable storage media reader 725a, which can further be connected to a computer-readable storage medium 725b, together (and, optionally, in combination with storage device(s) 720) comprehensively representing remote, local, fixed, and/or removable storage devices plus storage media for temporarily and/or more permanently containing computer-readable information. For example, the storage devices can be used to store the partition definition (e.g., as the local storage 460). In some embodiments, the computational system 700 can also include a processing acceleration unit 735, which can include a DSP, a special-purpose processor and/or the like.

The computational system 700 can also working memory 740, which can include RAM and ROM devices, for example, as described above. Software elements can be located within the working memory 740, for example, including an operating system 745 and/or other code 750, such as an application program (which can be a client application, web browser, mid-tier application, relational database management system (RDBMS), etc.). In some embodiments, one or more complex-wide partitioning functions are implemented as instructions stored as application code 750 in working memory 740, which, when executed, cause the one or more processors 705 to perform corresponding functions.

In some implementations, the computational system 700 includes a communications system 730 (e.g., a modem, a network card (wireless or wired), an infra-red communication device, etc.). The communications system 730 can permit data to be exchanged with a network 160 and/or any other computer described above with respect to the computational system 700. For example, via the network 160, the computational system 700 can communicate with one or more host systems 170, robotic control systems 762, monitoring systems 764, analytics systems 766, power systems 768, and/or any other suitable systems. Alternate embodiments of the computational system 700 can have numerous variations from those described above without departing from the scope of embodiments. For example, customized hardware might also be used and/or particular elements might be implemented in hardware, software (including portable software, such as applets), or both. Further, connection to other computing devices such as network input/output devices can be employed. In various embodiments of computational systems, like the one illustrated in FIG. 7, are used to implement one or more methods, such as those described below.

Figure 8:
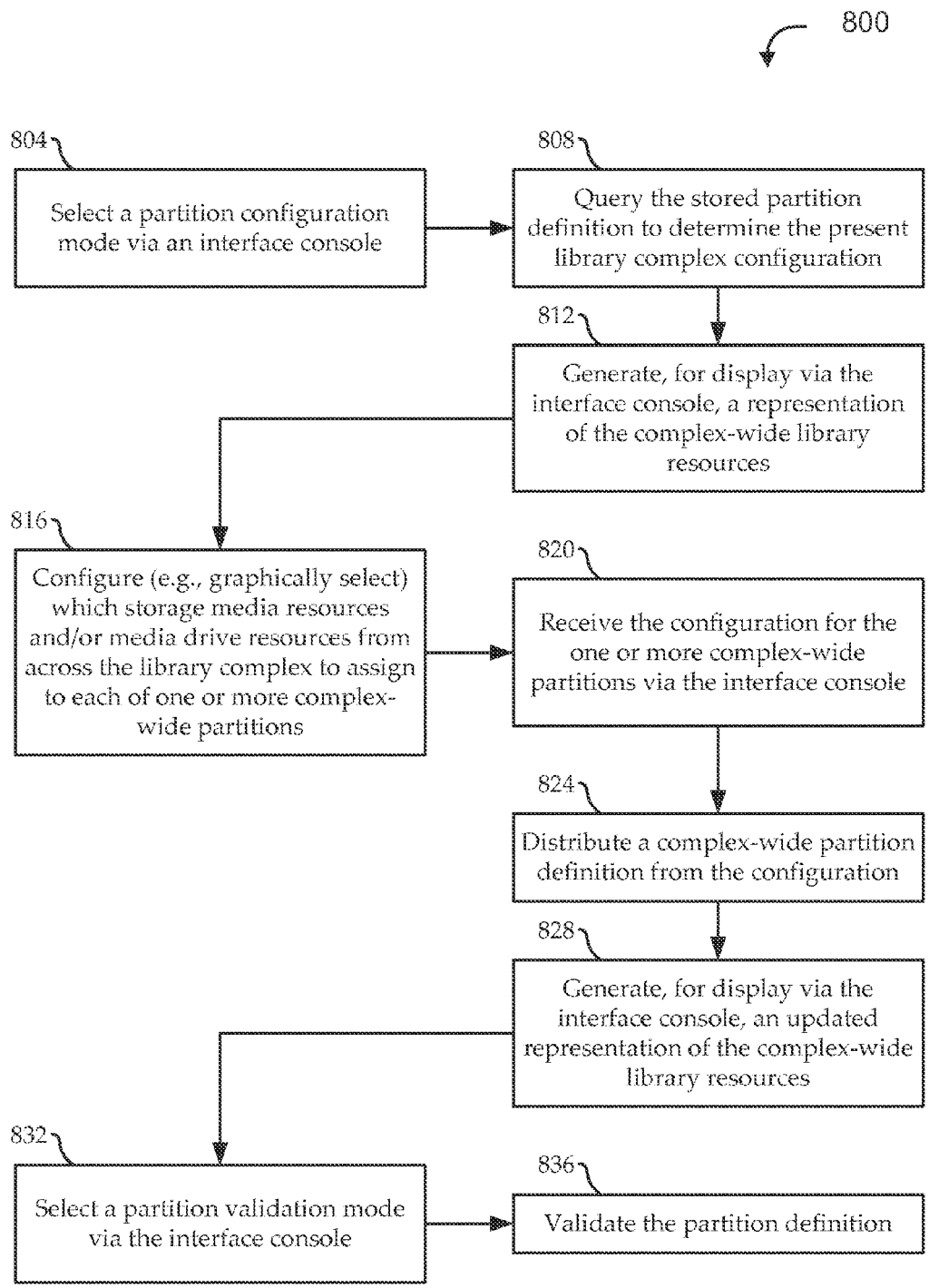
FIG. 8 shows a flow diagram of an illustrative method for configuring complex-wide library partitions, according to various embodiments.

FIG. 8 shows a flow diagram of an illustrative method 800 for configuring complex-wide library partitions, according to various embodiments. The method 800 operates in context of a complex of logically interconnected storage libraries that include a number of storage media resources and media drive resources, and further include or are in communication with at least one interface console. Embodiments begin at stage 804 by selecting a partition configuration mode via an interface console. For example, the "Design" window of FIG. 5 can be selected on a local console of a library in the complex. At stage 808, the presently stored partition definition can be queried to determine the present library complex configuration. For example, a processor subsystem of one or more of the libraries can query the partition definition to determine which storage media resources and/or which media drive resources (e.g., an/or other library resources, like robotic assemblies, in other embodiments) are presently assigned to which partitions. In some implementations, querying the partition definition can also include receiving information from the libraries of the complex regarding a state of the library resources (e.g., present status or a physical resource, whether a local slot location includes a physical resource, and/or any other suitable information). In response to the query, embodiments can generate, for display via the interface console, a representation of the complex-wide library resources (e.g., including their present partition allocations, state, etc.) at stage 812. For example, the display can be in the form of a graphical user interface (GUI) with which a user can interface via a touch screen or any other suitable input/output device.

At stage 816, embodiments configure which storage media resources and/or media drive resources from across the library complex to assign to each of one or more complex-wide partitions. For example, a user can interface with the GUI or other library resource representation to select, deselect, and/or otherwise affect resource allocations with respect to library partitions. The configuration for the one or more complex-wide partitions can be received by the library complex via the interface console (e.g., by the processor subsystem) at stage 820. In some embodiments, at stage 824, the partition configurations are translated into a complex-wide partition definition (e.g., when the "add" or "delete" button is selected, when the validation is passed, or at any suitable time) by, for example, creating a new partition definition, updating or modifying an existing partition definition, etc. In some implementations, the complex-wide partition definition is distributed (e.g., populated, etc.) to all the storage library systems in the complex, and the libraries (e.g., concurrently, in parallel) can each configure itself according to the partition definition for any of its local resources. At stage 828, an updated representation of the complex-wide library resources can be generated, for display via the interface console.

In some embodiments, a partition validation mode can be selected (e.g., by the user) via the interface console at stage 832. Some implementations automatically enter a validation mode (or require user entry into a validation mode) whenever any, or certain types of, changes are made to the configuration of a partition. The partition definition (i.e., the partition configurations) can be validated at stage 836. The partition definition can be validated in any suitable manner. For example, determinations can be made as to whether any resources are improperly assigned (e.g., concurrently assigned to multiple partitions where that is not allowed, assigned in a manner that violates access controls or other policies, etc.). Results of the validation can be stored and/or communicated in any suitable manner. For example, validation results can be locally logged, communicated to one or more host systems or other systems, etc. In some implementations, the updated display is not generated at stage 828 until after a validation occurs. In some such implementations, the display indicates any conflicts, successes, or other results of the validation. Some implementations allow the user to perform any the configuration changes in a "design" mode (e.g., including the configure and validate modes), and to separately enter a "commit" mode for generating and populating the updated partition definition only after the changes have been validated.

Figure 9:
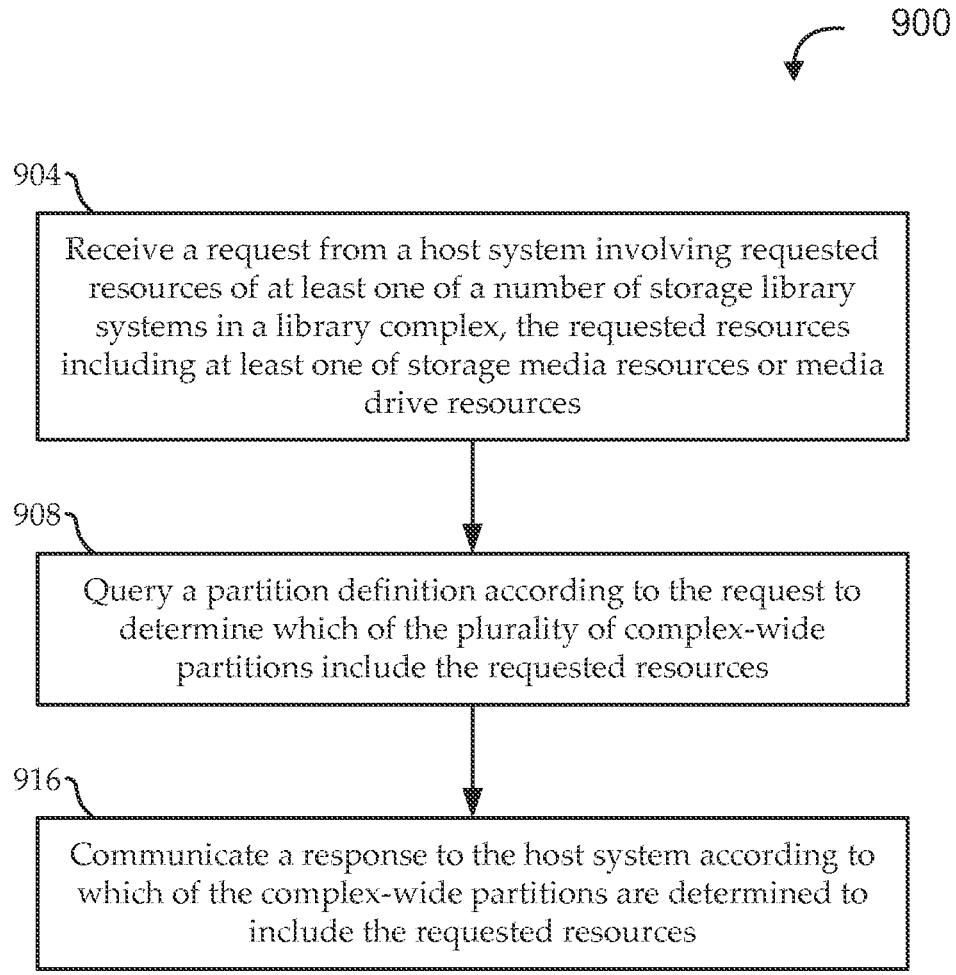
FIG. 9 shows a flow diagram of an illustrative method for interacting with complex-wide partitions, according to various embodiments.

FIG. 9 shows a flow diagram of an illustrative method 900 for interacting with complex-wide partitions, according to various embodiments. For example, embodiments of the method 900 can exploit complex-wide partitions generate according to the method of FIG. 8 or a similar technique. Embodiments of the method 900 begin at stage 904 by receiving a request from a host system involving requested resources (e.g., storage media resources and/or media drive resources) of at least one of a number of storage library systems configured as a library complex. As described above, the libraries of the complex can be logically interconnected with the each other, while defining a physically distinct environment, and each distinct environment can have its own set of storage media resources and media drive resources, and a local memory that operates to store a partition definition. Also as described above, the partition definition identifies which of the complex-wide library resources are presently assigned to each of a number of complex-wide partitions.

At stage 908, the partition definition can be queried according to the request to determine which of the plurality of complex-wide partitions include the requested resources. A response can be communicated to the host system at stage 912, according to which of the plurality of complex-wide partitions are determined to include the requested resources. In some embodiments, each storage library system is in direct, redundant communication with one or more host systems. In other embodiments, fewer than all of the storage library systems are in direct communication with the host system. For example, one of the storage library systems is in direct communication with the host system, and the others of the storage library systems are in indirect communication with the host system via the one (e.g., all the libraries are interconnected with a LAN, and there is a "master" library that communicates with remote systems). In some implementations, each storage library system is aware only of its local resources (e.g., its respective storage media resources and media drive resources). In some such implementations, querying the partition definition at stage 908 can include each of some or all of the libraries determining whether a portion of the requested resources is in its local resources and generating resource information corresponding to the portion of the requested resources determined to be in its local resources. For example, each library in the complex can provide relevant information in accordance with the request and with its local resources. In some such implementations, the response to the host system can be generated at stage 916 according to the respective resource information from multiple of the storage library systems. For example, each library can independently communicate its portion of the response to the host system (e.g., where each has an independent connection to the host system), the libraries can communicate information to a "master" library (e.g., or any of the libraries that is acting as the point of communication with the host system) for consolidation into a single response, or the response can be communicated in any other suitable manner. In certain implementations, request, query, and response handling can depend on access controls and/or other policy considerations. For example, a particular host system may be authorized to access only a subset of the complex-wide partitions, and processing a request for resources from that host system can involve determining an authorized set of the plurality of complex-wide partitions that the host system is authorized to access and determining which of the complex-wide library resources are included in the authorized set of complex-wide partitions.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A storage library complex in communication with a host system, the storage library complex comprising:
a plurality of storage library systems, each storage library system being logically interconnected with the other storage library systems, and each storage library system defining a physically distinct environment that comprises:
a plurality of storage media resources;
a plurality of media drive resources that operate to perform input/output functions on the storage media resources;
a local memory that operates to store a partition definition that identifies which of the plurality of storage media resources and which of the plurality of media drive resources from across the plurality of storage library systems are presently assigned to each of a plurality of complex-wide partitions,
wherein at least one of the complex-wide partitions includes a set of the storage media resources physically located in a first of the storage library systems and a set of the storage media resources physically located in a second of the storage library systems; and
at least one processor that operates to:
receive a request from a host system involving requested resources of at least one of the storage library systems, the requested resources comprising at least one of storage media resources or media drive resources from the plurality of storage library systems;
query the partition definition according to the request to determine which of the plurality of complex-wide partitions include the requested resources; and
communicate a response to the host system according to which of the plurality of complex-wide partitions are determined to include the requested resources.

2. The storage library complex of claim 1, further comprising:
an interface console in communication with the at least one processor of at least one of the storage library systems,
wherein the at least one processor of the at least one of the storage library systems further operates to:
generate, for display via the interface console, a representation of the storage media resources and the media drive resources across the plurality of storage library systems;
receive a configuration for at least one of the plurality of complex-wide partitions via the interface console; and
generate the partition definition from the configuration.

3. The storage library complex of claim 2, wherein the at least one processor of the at least one of the storage library systems operates to:
generate the representation for display as a graphical user interface (GUI) via the interface console as a graphical representation of the storage media resources and the media drive resources across the plurality of storage library systems; and
receive the configuration graphically from a human user via the GUI via the interface console.

4. The storage library complex of claim 2, wherein the interface console is implemented as a local console of at least one of the storage library systems, a local console in communication with at least one of the storage library systems, or a remote workstation in communication with at least one of the storage library systems.

5. The storage library complex of claim 1, wherein:
for each of the plurality of complex-wide partitions having at least one of storage media resources or media drive resources assigned thereto, the partition definition has at least one partition entry, and each partition entry is associated with the respective partition, indicates whether the partition entry is for storage media resources or for media drive resources, and identifies at least some of the storage media resources and/or media drive resources from the plurality of storage library systems that are assigned to its respective partition, such that the union of the partition entries associated with each respective partition identifies all the storage media resources and media drive resources from the plurality of storage library systems that are assigned to the respective partition.

6. The storage library complex of claim 5, wherein:
each partition entry includes a plurality of fields, each field corresponding to a hierarchical locator having a plurality of associated locations, and each field having a value that identifies a set of the associated locations, such that each partition entry identifies the at least some of the storage media resources and/or media drive resources that are assigned to its respective partition as the intersection of the sets identified by its fields.

7. The storage library complex of claim 6, wherein the value of each field can identify an individual associated location for its corresponding hierarchical locator, a range of associated locations for its corresponding hierarchical locator, or all associated locations for its corresponding hierarchical locator.

8. The storage library complex of claim 5, wherein each partition entry comprises:
a first field that identifies a set of the storage library systems;
a second field that identifies a set of a plurality of storage media arrays or storage drive arrays;
a third field that identifies a set of first two-dimensional array coordinates; and
a fourth field that identifies a set of second two-dimensional array coordinates,
such that the at least some of the storage media resources and/or media drive resources that are identified by the partition entry as being assigned to the respective partition are defined as the intersection of the sets identified by the fields of the partition entry.

9. The storage library complex of claim 1, wherein the local memories of the plurality of storage library systems operate to redundantly store the same partition definition.

10. The storage library complex of claim 1, wherein:
the host system is authorized to access only a subset of the plurality of complex-wide partitions;
the request from the host system comprises a request for a listing of at least some of the storage media resources and/or the media drive resources that are accessible by the host system; and
querying the partition definition comprises determining an authorized set of the plurality of complex-wide partitions that the host system is authorized to access, and determining which of the at least some of the storage media resources and/or the media drive resources are included in the authorized set of complex-wide partitions.

11. The storage library complex of claim 1, wherein:
each of the plurality of storage library systems is aware only of its local resources, comprising its respective plurality of storage media resources and its respective plurality of media drive resources;
the at least one processor of each storage library system further operates to:
determine whether a portion of the requested resources is in its local resources; and
generate resource information corresponding to the portion of the requested resources determined to be in its local resources,
wherein the response to the host system is generated according to the respective resource information from at least two of the storage library systems.

12. The storage library complex of claim 1, wherein:
one of the plurality of storage library systems is in direct communication with the host system; and
the others of the plurality of storage library systems are in indirect communication with the host system via the one of the plurality of storage library systems.

13. The storage library complex of claim 1, wherein:
each of the plurality of storage library systems is in direct, redundant communication with the host system.

14. The storage library complex of claim 1, wherein:
each of the storage media resources logically identifies either a physical storage medium or a storage media slot location.

15. The storage library complex of claim 1, wherein:
each of the media drive resources logically identifies either a physical media drive or a media drive slot location.

16. A method for partitioning a storage library complex in communication with a host system, the method comprising:
receiving a request from a host system involving requested resources of at least one of a plurality of storage library systems, the requested resources comprising at least one of storage media resources or media drive resources from the plurality of storage library systems, each storage library system being logically interconnected with the other storage library systems, and each storage library system defining a physically distinct environment that comprises a plurality of storage media resources, a plurality of media drive resources that operate to perform input/output functions on the storage media resources, and a local memory that operates to store a partition definition that identifies which of the plurality of storage media resources and which of the plurality of media drive resources from across the plurality of storage library systems are presently assigned to each of a plurality of complex-wide partitions,
wherein at least one of the complex-wide partitions includes a set of the storage media resources physically located in a first of the storage library systems and a set of the storage media resources physically located in a second of the storage library systems;
querying the partition definition according to the request to determine which of the plurality of complex-wide partitions include the requested resources; and
communicating a response to the host system according to which of the plurality of complex-wide partitions are determined to include the requested resources.

17. The method of claim 16, further comprising:
generating, for display via an interface console, a representation of the storage media resources and the media drive resources across the plurality of storage library systems;
receiving a configuration for at least one of the plurality of complex-wide partitions via the interface console; and
generating the partition definition from the configuration.

18. The method of claim 16, wherein:
for each of the plurality of complex-wide partitions having at least one of storage media resources or media drive resources assigned thereto, the partition definition has at least one partition entry, and each partition entry includes a plurality of fields that identify at least some of the storage media resources and/or media drive resources from the plurality of storage library systems that are assigned to its respective partition, such that the intersection of the fields of each partition entry and the union of the partition entries associated with each respective partition identify all the storage media resources and media drive resources from the plurality of storage library systems that are assigned to the respective partition.

19. The method of claim 16, wherein:
the host system is authorized to access only a subset of the plurality of complex-wide partitions;
the request from the host system comprises a request for a listing of at least some of the storage media resources and/or the media drive resources that are accessible by the host system; and
querying the partition definition comprises determining an authorized set of the plurality of complex-wide partitions that the host system is authorized to access, and determining which of the at least some of the storage media resources and/or the media drive resources are included in the authorized set of complex-wide partitions.

20. The method of claim 16, wherein each of the plurality of storage library systems is aware only of its local resources, comprising its respective plurality of storage media resources and its respective plurality of media drive resources, and further comprising:
determining whether a portion of the requested resources is in its local resources; and
generating resource information corresponding to the portion of the requested resources determined to be in its local resources,
wherein the response to the host system is generated according to the respective resource information from at least two of the storage library systems.

21. A storage library complex in communication with a host system, the storage library complex comprising:
a plurality of storage library systems, each storage library system being logically interconnected with the other storage library systems, and each storage library system defining a physically distinct environment that comprises:
a plurality of storage media resources;
a plurality of media drive resources that operate to perform input/output functions on the storage media resources;
a local memory that operates to store a partition definition that identifies which of the plurality of storage media resources and which of the plurality of media drive resources from across the plurality of storage library systems are presently assigned to each of a plurality of complex-wide partitions; and
at least one processor that operates to:
receive a request from a host system involving requested resources of at least one of the storage library systems, the requested resources comprising at least one of storage media resources or media drive resources from the plurality of storage library systems;
query the partition definition according to the request to determine which of the plurality of complex-wide partitions include the requested resources; and
communicate a response to the host system according to which of the plurality of complex-wide partitions are determined to include the requested resources,
wherein one of the plurality of storage library systems is in direct communication with the host system, and the others of the plurality of storage library systems are in indirect communication with the host system via the one of the plurality of storage library systems.

* * * * *

UNITED STATES PATENT AND TRADEMARK OFFICE
CERTIFICATE OF CORRECTION

| | | |
|---|---|---|
| PATENT NO. | : 9,436,405 B2 | Page 1 of 1 |
| APPLICATION NO. | : 14/139466 | |
| DATED | : September 6, 2016 | |
| INVENTOR(S) | : Kim et al. | |

It is certified that error appears in the above-identified patent and that said Letters Patent is hereby corrected as shown below:

In the Drawings

On sheet 2 of 9, in FIG. 2, under Reference Numeral 150a, Line 1, delete "Processr" and insert -- Processor --, therefor.

On sheet 2 of 9, in FIG. 2, under Reference Numeral 150b, Line 1, delete "Processr" and insert -- Processor --, therefor.

On sheet 2 of 9, in FIG. 2, under Reference Numeral 150c, Line 1, delete "Processr" and insert -- Processor --, therefor.

In the Specification

In Column 9, Line 36, delete "1150" and insert -- 150 --, therefor.

In Column 12, Line 43, delete "an/or" and insert -- and/or --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*